United States Patent
Arulandu et al.

(10) Patent No.: US 9,681,521 B2
(45) Date of Patent: Jun. 13, 2017

(54) LIGHTING DEVICE

(71) Applicant: KONINKLIJKE PHILIPS N.V., Eindhoven (NL)

(72) Inventors: Kumar Arulandu, Breda (NL); Willem Franke Pasveer, Dordrecht (NL); Antonius Petrus Marinus Dingemans, Tilburg (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 4 days.

(21) Appl. No.: 14/892,834

(22) PCT Filed: May 15, 2014

(86) PCT No.: PCT/EP2014/059911
§ 371 (c)(1),
(2) Date: Nov. 20, 2015

(87) PCT Pub. No.: WO2014/187717
PCT Pub. Date: Nov. 27, 2014

(65) Prior Publication Data
US 2016/0095190 A1     Mar. 31, 2016

(30) Foreign Application Priority Data
May 21, 2013   (EP) .................................... 13168530

(51) Int. Cl.
*H05B 37/02*   (2006.01)

(52) U.S. Cl.
CPC ....... *H05B 37/0227* (2013.01); *H05B 37/029* (2013.01); *H05B 37/0272* (2013.01)

(58) Field of Classification Search
CPC ............ H05B 37/0227; H05B 37/0272; H05B 37/029; H05B 37/0236; H05B 37/0245;
(Continued)

(56) References Cited

U.S. PATENT DOCUMENTS

| 2007/0160373 | A1* | 7/2007 | Biegelsen | .......... H05B 37/0272 398/118 |
| 2009/0045971 | A1* | 2/2009 | Simons | ............. H05B 37/0272 340/9.16 |

(Continued)

FOREIGN PATENT DOCUMENTS

| DE | 3904914 A1 | 8/1990 |
| WO | 2010070520 A1 | 6/2010 |

(Continued)

*Primary Examiner* — Jimmy Vu
*Assistant Examiner* — Henry Luong
(74) *Attorney, Agent, or Firm* — Meenakshy Chakravorty

(57) ABSTRACT

A first lighting device comprises an electromagnetic sensor operable to receive an electromagnetic signal from at least one other lighting device, an acoustic sensor operable to receive an acoustic signal from the other lighting device, and a signal processing module. The signal processing module is configured to determine a distance between the first lighting device and the other lighting device by comparing the acoustic and electromagnetic signals received from the other lighting device. For example, the signals may be emitted when the other device detects occupancy in a space, and the first device may control its light output in dependence on receipt of the signals and the distance from the device that detected the occupancy.

18 Claims, 3 Drawing Sheets

(58) Field of Classification Search
CPC .. H05B 37/034; H05B 37/038; H05B 33/0833; H05B 33/0845; H05B 33/0854; H05B 33/0872; H05B 33/0869
USPC ........ 315/149–150, 155, 158–159, 291, 297, 315/307–308
See application file for complete search history.

(56) References Cited

U.S. PATENT DOCUMENTS

| | | |
|---|---|---|
| 2010/0265100 A1 | 10/2010 | Jalbout et al. |
| 2012/0086345 A1 | 4/2012 | Tran |
| 2012/0161645 A1* | 6/2012 | Dingemans ........ H05B 37/0218 315/153 |
| 2012/0194083 A1 | 8/2012 | Henig et al. |
| 2014/0286517 A1* | 9/2014 | Luna ...................... H04R 1/028 381/332 |
| 2015/0061509 A1* | 3/2015 | Karlicek ............ G06K 9/00369 315/153 |

FOREIGN PATENT DOCUMENTS

| | | |
|---|---|---|
| WO | 2011039688 A1 | 4/2011 |
| WO | 2012131631 A1 | 10/2012 |
| WO | 2013057626 A2 | 4/2013 |
| WO | 2013068861 A1 | 5/2013 |

* cited by examiner

LIGHTING DEVICE

CROSS-REFERENCE TO PRIOR APPLICATIONS

This application is the U.S. National Phase application under 35 U.S.C. §371 of International Application No. PCT/EP2014/059911, filed on May 15, 2014, which claims the benefit of European Patent Application No. 13168530.7, filed on May 21, 2013. These applications are hereby incorporated by reference herein.

TECHNICAL FIELD

The present disclosure relates to a lighting device for use amongst one or more other lighting devices, e.g. for use in a lighting system where the illumination output of different devices is desired to be made dependent on a detected occupancy.

BACKGROUND

Lighting systems of today use occupancy detection and advanced control systems with predefined detection zones and lighting zones. FIG. 1 gives an example of an existing lighting system with occupancy detection. The system comprises a plurality of controllers 10, 20 each comprising a respective presence sensor in the form of an occupancy sensor, and a plurality of lighting devices in the form of luminaires 1.1 . . . 2.6. The luminaires are grouped into different lighting zones, and the luminaires of each lighting zone are connected to a respective one of the controllers to be controlled based on its respective occupancy sensor. Each controller 10, 20 is connected to a power supply 32 (e.g. mains power supply) and may be connected to supply power onwards to the luminaires of its respective group as and when required. In the illustrated example, a first group of luminaires 1.1 . . . 1.6 is connected to be controlled by a first controller 10 based on a first occupancy sensor, and a second group of luminaires 2.6 is connected to be controlled by a second controller 20 based on a second occupancy sensor. For example, the luminaires may be mounted on the ceiling and/or walls of an indoor space such as an office space, and the different lighting groups may correspond to different rooms and/or different regions of a room. The number of luminaires and groups and their locations may be arranged as desired depending on the application in question.

Each controller's occupancy sensor is arranged to detect presence of an occupant 30 (typically a human) when in that sensor's respective detection zone, e.g. based on known infrared or ultrasound sensing techniques. The sensor is arranged so that its detection zone services the lighting zone of the respective group of luminaires. When occupancy is detected by the sensor of one of the controllers 10, 20 in a given detection zone, the controller controls all the luminaires of that group to turn on. In detection zones where occupancy has not been detected on the other hand, the respective controller keeps all the luminaires of its group turned off. For example in FIG. 1, an occupant 30 is detected by the occupancy sensor of the first controller 10 to be in the detection zone corresponding to the first group of luminaires 1.1 . . . 1.6, and the first controller 10 turns on all the luminaires of that group with a uniform illumination (e.g. each at 60% of maximum output). But in the detection zone corresponding to the second group of luminaires 2.1 . . . 2.6, the occupancy sensor of the second controller 20 has not detected an occupant and so the second controller 20 keeps the luminaires of that group completely switched off.

SUMMARY

According to one aspect of this disclosure, there is provided a lighting device comprising an electromagnetic sensor operable to receive an electromagnetic signal from at least one other lighting device, and an acoustic sensor operable to receive an acoustic signal from the other lighting device. For example the acoustic sensor may comprise an ultrasound sensor which receives an ultrasound signal, and the electromagnetic sensor may comprise an optical sensor which receives an optical signal such as a coded light signal encoded into the visible illumination output of the other device.

The lighting device further comprises a signal processing module, which is configured to determine a distance between itself and the other lighting device by comparing the acoustic and electromagnetic signals received from the other lighting device—e.g. based on the difference in arrival time and/or intensity of the acoustic signal compared with that of the optical signal.

Reciprocally, in embodiments the lighting device may also comprise transmitters for sending its own instances of the electromagnetic and acoustic signals out for detection by the one or more other devices.

In further embodiments, one or more of the lighting devices may comprise a presence sensor, and the emission of the signals from that device may be triggered by its respective sensor detecting presence, e.g. detecting a human, living or moving occupant.

In an exemplary application, this may be used to implement a lighting system with distributed occupancy detection and control. Each individual one of a plurality of luminaires is equipped with an occupancy sensor and may be installed as a stand-alone unit (or at least with less configuration to coordinate their behavior than might have been required otherwise). However, the individual luminaires in the same space (e.g. office or other room) will also work together in a distributed fashion, forming an intelligent lighting system to save power and/or provide a desired light distribution. When one of the luminaires detects presence, it turns itself on and also emits both an electromagnetic signal (e.g. coded into its illumination) and an acoustic signal (e.g. ultrasound). If a nearby luminaire hears the signals it uses them to determine the distance from the luminaire that detected occupancy, and controls itself to turn on at some dimmed level in dependence on the distance. Thus together, the luminaires provide a staggered illumination distribution centered approximately around the detected occupant.

In other applications, the determination of distance between luminaires based on the two types of signal may also be useful in other scenarios, e.g. in a commissioning phase.

According to another aspect, there is provided a computer program product for operating a lighting device. The computer program product comprises coded embodied on a computer readable medium, and which is configured so as when executed on a processor to perform operations in accordance with any of the lighting device features disclosed herein.

BRIEF DESCRIPTION OF THE DRAWINGS

For a better understanding of the present disclosure and to show how in embodiments it may be put into effect, reference is made by way of example to the accompanying drawings in which.

DETAILED DESCRIPTION OF PREFERRED EMBODIMENTS

The following describes an example implementation of a lighting system with occupancy detection and distributed control based on coded light and ultrasound. The system makes use of coded light and ultrasound to determine the distance from occupancy detection.

Figure 1:
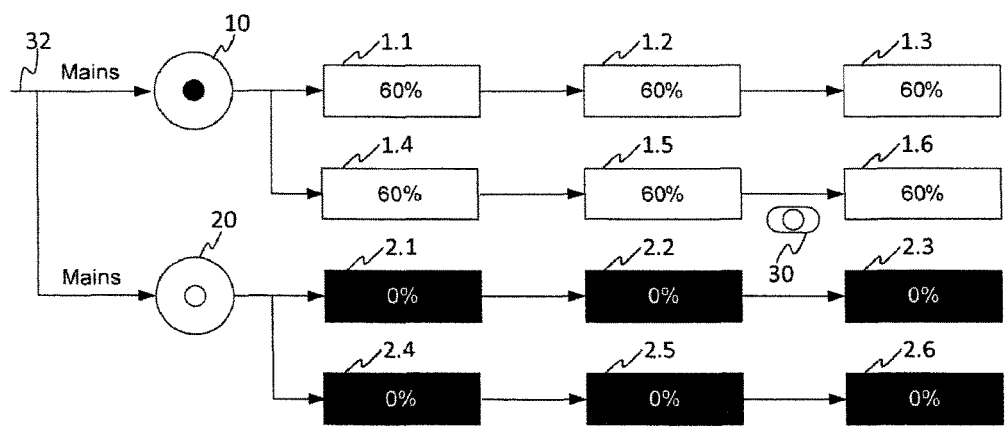
FIG. 1 is a schematic block diagram of a lighting system controlled based on occupancy.

As discussed in relation to FIG. 1, existing lighting systems use occupancy detection and control based on predefined detection zones and lighting zones. However, this means sensors and luminaires have to be pre-configured and wired according to the demand of light and sensor detection range, and additional wiring or RF communications is required to interface the sensors to the luminaires. This is cumbersome in terms of commissioning, and once the floor plan of the office changes then the lighting system may also need to be reconfigured. Further, the zone-based system still does not necessarily provide as good a balance between the demand for light and energy saving as might be hoped for.

Figure 2:
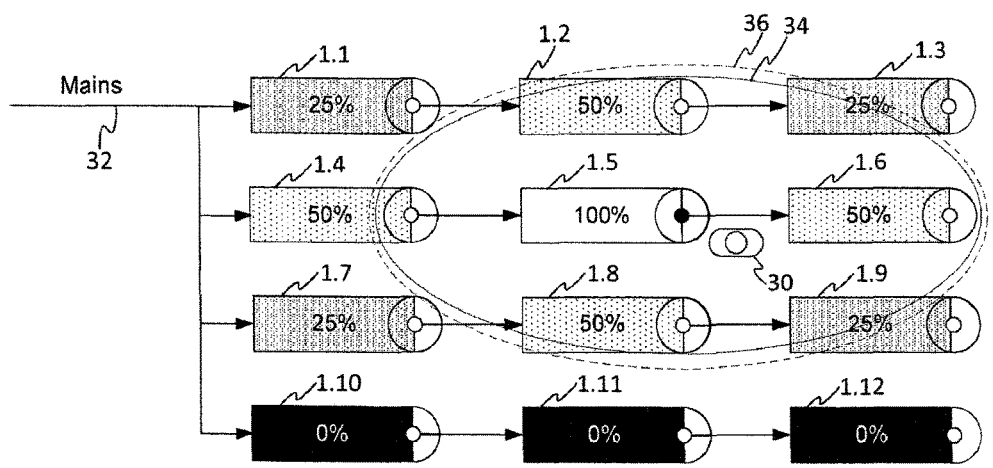
FIG. 2 is a schematic block diagram of a lighting system with distributed control.

A more desirable situation for occupancy detection and lighting is illustrated in FIG. 2.

Here the system comprises a distributed system of individual luminaires 1.1 . . . 1.12. Each luminaire 1.1 . . . 1.12 can be installed as a stand-alone unit, or at least with less configuration to coordinate between than might have been required using prior techniques. In embodiments, each may have its own connection to a power supply 32 (e.g. the mains supply). However each individual luminaire in the same office or room will also be part of an intelligent lighting system to save power and/or provide optimal light distribution. In the illustrative example of FIG. 2 the luminaires labeled 1.7 . . . 1.12 may be considered analogous to those labeled 2.1 . . . 2.6 in FIG. 1, except that in the arrangement of FIG. 2 there is no concept of discrete groups nor a common controller for any particular group of luminaires.

Figure 3:
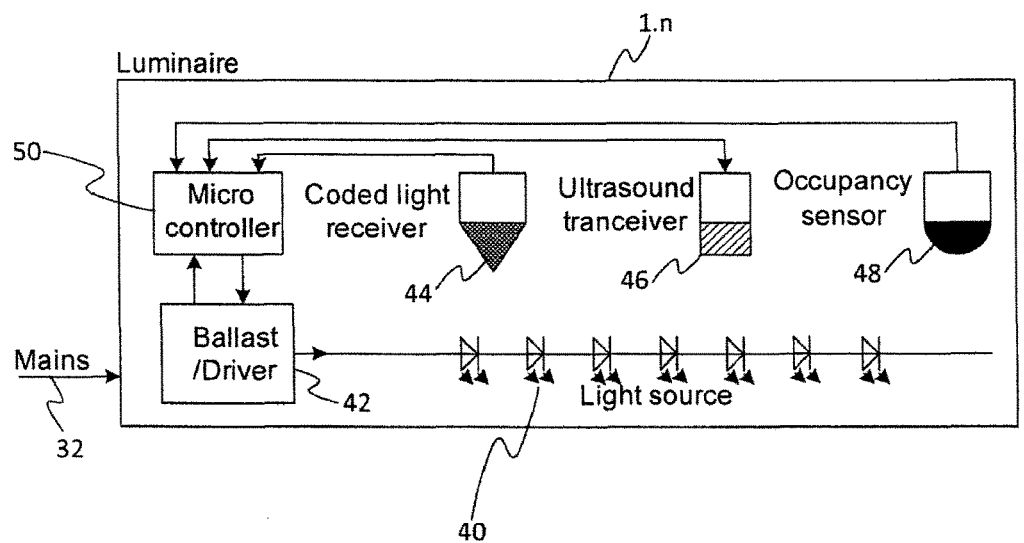
FIG. 3 is a schematic block diagram of a luminaire.

Referring also to FIG. 3, each luminaire 1.1 . . . 1.12 comprises its own respective controller comprising its own respective occupancy sensor 48, as well as a respective electromagnetic sensor in the form of coded light receiver 44 for use in sensing coded light signals, and a respective acoustic transceiver in the form of an ultrasound transceiver 46 for emitting and sensing ultrasound signals. In embodiments the ultrasound transceiver 46 may act as the occupancy sensor 48 as well, to save on components. Alternatively the occupancy sensor may comprise a separate sensor such as an infrared sensor. Each luminaire also comprises a light source 40, which also acts as coded light transmitter, and a ballast 42 connected to drive the light source 40.

The respective controller of each luminaire further comprises a signal processing module coupled to each of the ballast 42, coded light receiver 44, ultrasound transceiver 46 and occupancy sensor 48. The signal processing module may be implemented in the form of a microcontroller 50, comprising a processor having one or more execution units and a memory storing code arranged to run on the processor. The code is configured so as when executed to operate the respective ballast 42, coded light receiver 44, ultrasound transceiver 46 and occupancy sensor 48 of each luminaire 1.1 . . . 1.12 to provide the following functionality. Alternatively it is not excluded that some or all of this functionality dedicated hardware circuitry or reconfigurable hardware circuitry (e.g. an FPGA).

When the occupancy sensor of one of the luminaires (e.g. 1.5) detects presence of an occupant 30 within its respective range, its controller turns that luminaire on to a high illumination output level, e.g. to its maximum output. In response to the detection, the controller of that luminaire also emits both an ultrasound signal 36 and an optical signal 34 in the form a coded light signal encoded into its illumination output. As will be familiar to a person skilled in the art, coded light refers to a technique whereby a signal such as an identifiable code is modulated into the visible illumination emitted by a luminaire (e.g. modulating the light with a certain frequency or variable frequency, not perceptible to the human eye).

When these signals are received by one or more neighboring or nearby luminaires (e.g. 1.1, 1.2, 1.3, 1.4, 1.6, 1.7, 1.8, 1.9), the respective controller of each of those luminaires uses the combined input of ultrasound and coded light to determine distance information relative to the detected occupancy, and sets its own respective lighting intensity as function of position of occupant. The distance may be determined on the basis that light arrives almost immediately, whereas the slower speed of sound means the acoustic signal arrives with a delay. By comparing the timing of the two received signals, the controller of any receiving luminaire is able to determine the distance to the luminaire that detected occupancy. The receiving luminaires then set their illumination output to a level that is dimmed relative to the higher (e.g. maximum) output level used when a luminaire (like 1.5) directly detects occupancy itself.

For example the luminaire 1.5 that detected occupancy may set its output to 100%, while nearby luminaires (e.g. 1.2, 1.4, 1.6, 1.8) determine the distance to this luminaire is within a first threshold and in response set their illumination output to a first intermediate level such as 50% of maximum brightness (e.g. measured in terms of power or luminance). Other nearby luminaires (e.g. 1.1, 1.3, 1.7, 1.9) may determine that the distance to the detecting luminaire 1.5 is between the first threshold and a second threshold, and in response may set their illumination output to a second intermediate level such as 25% where the second threshold represents a greater distance than the first threshold and the second intermediate level provides a lower illumination output than the first intermediate level. Further levels of gradation could be used in further embodiments.

As an example, a receiving luminaire may go to 50% when the distance is >5 m, to 70% when the distance is 3 to 5 m, and 100% when the distance is <3 m.

Other luminaires (e.g. 1.10, 1.11, 1.2) either do not receive the signals 34, 36, or receive them but determine that the distance is beyond a maximum threshold (e.g. beyond the second threshold). These Luminaires leave their output illumination at default lower level (e.g. 0%). Any of those that do turn on (1.1 . . . 1.9) may continue to be triggered as long as a nearby one of the luminaires (e.g. 1.5) continues to detect occupancy and therefore send out repeated instances of the optical and acoustic signals. Otherwise the luminaires may be configured to turn off after certain time period has elapsed. If the occupant 30 moves through the space, different ones of the luminaires will be triggered and the light distribution will move accordingly, remaining "focused" or centered approximately around the detected occupancy depending on which of the luminaires' sensing range the occupant 30 falls within and therefore which is currently emitting the optical and acoustic signals.

In embodiments, such an arrangement may improve energy saving. Light is provided on demand, as and when needed, in a distribution more appropriate to the occupancy. The luminaire within whose occupancy the detected occupant is turned on fully, whilst the light contribution from surrounding luminaires is turned on at a lower, dimmed level and others may not be turned on at all.

Further, in embodiments installation need not require additional wiring as the luminaires interact wirelessly. The luminaries can be easily installed as stand-alone units—the user simply plugs each luminaire into the mains individually, and the system configures itself based on the distributed behavior of each luminaire. Also, reconfiguration need not be required as the system uses natural or "native" boundaries such as walls, doors and windows to separate lighting groups (i.e. boundaries that are already present in the environment for other purposes), by taking advantage of the natural confinement properties of ultrasound and/or visible light (whereas RF for example goes though these natural boundaries). For example a natural boundary might be the walls between rooms. In prior systems, a user would have to configure the system into separate groups for the different rooms. However, using visible light and sound to signal between luminaires, the signals are blocked by the same boundary that separates the visible illumination between rooms—hence the system naturally behaves in a manner the user would expect without needing to be pre-configured in this way.

In some applications, occupants may still want some light in all regions of a space such as an open plan office, e.g. a minimum of 100 Lux. In embodiments, the luminaires at 25% and 50% (or more generally the luminaires that receive the signals from the detecting luminaire) may send out a "second hand" signal in response to receiving the first hand signals, such that this is repeated through the whole network. For example this could keep the room rest of the room at a minimum of 25%. In further embodiments, each luminaire may also be configured with a "hop counter" to limit the effect.

Note, where light levels of a luminaire are described above as a percentage, this could represent a percentage relative to a maximum or reference level of the luminaires' own lamp, or relative to the lamp of another luminaire. Generally the light levels may be variable according to any discrete or continuous relationship, whereby one or more lamps or other lighting element(s) can take at least one lower or higher level with respect to one or more other lamp(s) or element(s).

Figure 4:
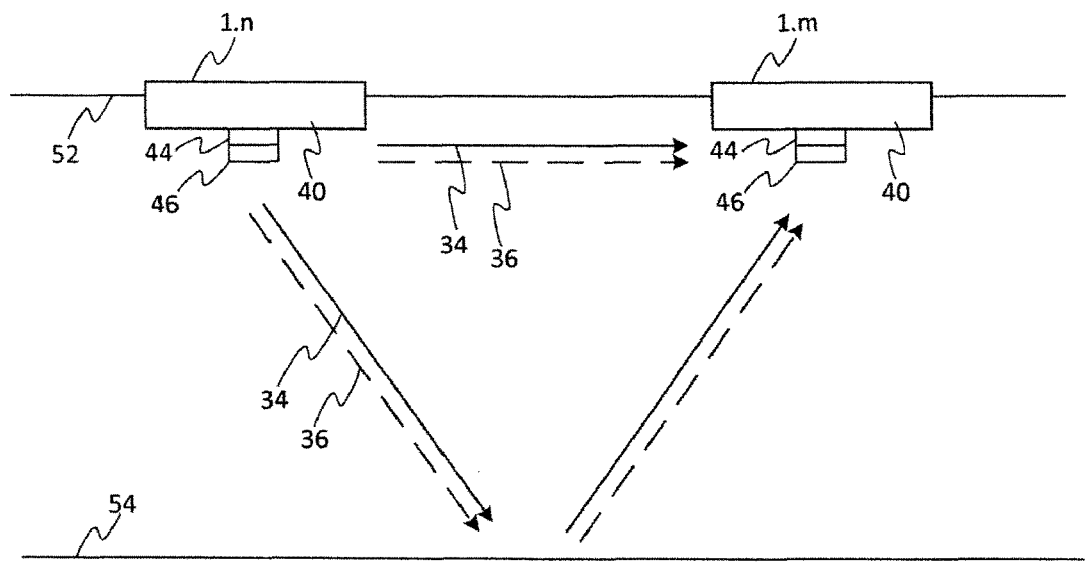
FIG. 4 is a schematic side view of a room installed with a plurality of lighting devices.

FIG. 4 schematically illustrates an example of how the luminaires may be arranged within a space such as an office or other room. FIG. 4 illustrates an example pair of luminaires 1.*m* and 1.*n* (e.g. which could be any of those illustrated in FIG. 2) but it will be appreciated that similar comments apply to other combinations.

In embodiments, the luminaires are arranged to determine the shortest radial distance between them. Each of the luminaires 1.*m*, 1.*n* is mounted on a ceiling 52 and arranged to illuminate a lower surface 54 such as a floor or desk.

This may be achieved without requiring a direct line of sight between the transmitting and receiving luminaires 1.*m*, 1.*n*. Instead the signal processing module 50 may be configured to measure the height of its luminaire from the floor 54 (or desk or other lower surface) using the ultrasound sensor. It can be pre-programmed based on the type of luminaire, the height and the distribution distance to other luminaires (typically the distance in the plane of the ceiling). This geometry allows the luminaires to calculate the distance towards the occupancy device via reflected signals, e.g. from a surface 54 as illustrated in FIG. 4. In general, the raw data of the ultrasound sensor contains many reflections, but the signal processing module 50 may be configured use the shortest distance between the transmitter and receiver, because this is the radius distance towards the transmitter. Note that the geometry may only need to be taken into account for the ultrasound signal—light travels almost the same path (as the speed of light is much higher than that of sound, the difference between direct line of sight or indirect line of sight will be negligible).

In an alternative implementation the ultrasound and/or light transmitter and receiver may be given a direct line of sight. To facilitate a direct line of sight, each luminaire 1.*m*, 1.*n* may be mounted not entirely flush with the surface of the ceiling 52, but somewhat proud of it so that at least the light source 40 protrudes at least partially from the ceiling 52. Further, the coded light receiver 44 stands at least partially proud of the light source 40 and ceiling 52. The coded light receiver 44 may be shielded from the light of its own respective light source 40. Alternatively the coded light signals from the different luminaires 1.*m*, 1.*n* may comprise different codes so that the light from one can be distinguished from the other. The ultrasound transceiver may also stand proud of the luminaire 1.*m*, 1.*n* and/or ceiling, though not necessarily if the ultrasound can sufficiently penetrate the casing of the luminaire and/or material of the ceiling.

Hence in embodiments the coded light receiver 44 of each luminaire has a direct line of sight to the light output of each of one or more other neighboring or nearby luminaires, and the acoustic transceiver 46 of each luminaire has a direct line of sight to that of each of the other neighboring or nearby luminaires. Thus when occupancy is detected, the coded light receiver 44 of a first one of the luminaires 1.*m* receives a coded illumination 34 directly from a second one of the luminaires 1.*n*, and the ultrasound transceiver 46 of the first luminaire 1.*n* receives the ultrasound signal 36 directly from the ultrasound transceiver 46 of the second luminaire 1.*n*. The signal processing module 50 at the first luminaire 1.*m* is then able to determine the straight-line distance between them based on the difference in arrival time between the coded light and ultrasound signals and the speed of sound.

In embodiments, the light source 40, coded light receiver 44 and ultrasound transceiver 46 of each luminaire is omnidirectional, at least in the horizontal plane. Such components in themselves are available to a person skilled in the art. This enables the luminaires to be installed and to automatically provide the distributed occupancy detection and control without any particular planning as to their positions. Alternatively one or more of the light sources 40, receivers 44 and/or transceiver 46 could be directional, though in some applications this may require some additional planning when installing the luminaires.

In embodiments the coded light receiver 44 and/or the ultrasound transceiver 46 may be arranged to avoid an effect of multiple different versions of the signal occurring due to reflections, or at least multiple different versions of the acoustic signal. Reflections of the light signals may be more tolerable if the light is considered to arrive almost instantaneously anyway.

To avoid an adverse effect of multiple reflected versions of the signal(s), in embodiments the signal processing module 50 is configured to measure its luminaire's height from the floor (or other lower surface) and to combine this data with data from the factory software, which includes information about the type of luminaire and the possible distribution of luminaires in that application. Based on this, it will be able to determine and reduce detection distance error. For example, knowledge of this geometry may enable the distance measurement to be made based on only the first audio pulse that arrives at the transducer.

Alternatively, the coded light receiver 44 and/or the ultrasound transceiver 46 may be shielded to only receive signals from a desired angle. For example in the situation where arranged to have line of sight, they may be shielded to only receive signals in a plane in which the luminaires are arranged, e.g. in the plane of the ceiling 52. This way they will not pick up unwanted reflected versions of the signal. Alternatively, the signal processing module 50 may be configured to apply a power threshold to received signals to filter out unwanted reflections, on the basis that more vicariously reflected signals will tend to be much lower power than the more direct signals. In another alternative, a certain frequency may be embedded in the ultrasound which if detected makes the system more reliable. A combination of these techniques may also be used.

Figure 5:
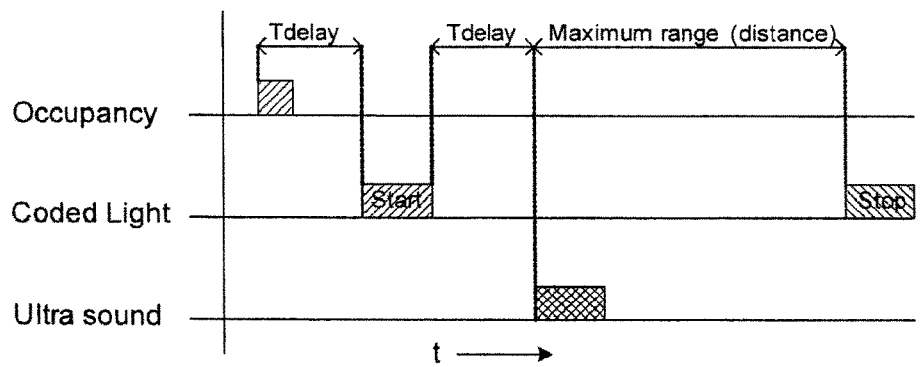
FIG. 5 is a schematic timing diagram illustrating the behavior of a lighting device in a master mode.
Figure 6:
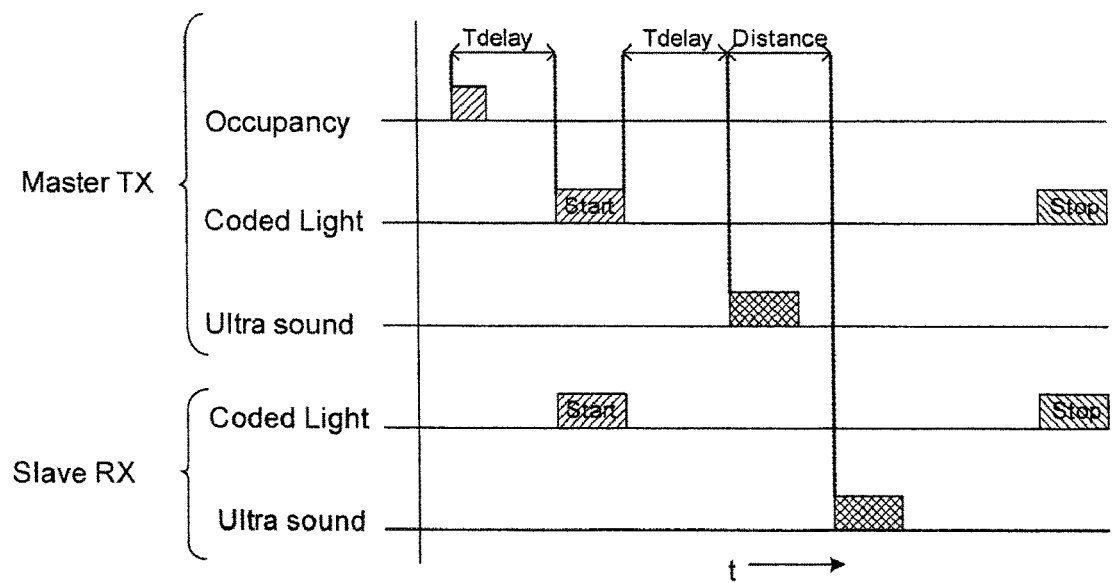
FIG. 6 is a schematic timing diagram illustrating the behavior of a lighting device in a slave mode.

Referring now to FIGS. 5 and 6, in embodiments a luminaire may be configured to operate in two different modes of operation: a master mode and a slave mode.

FIG. 5 is a timing diagram illustrating the master mode of operation. A luminaire enters into master mode once it has detected occupancy. The luminaire will switch to maximum brightness level and send an ultrasound and coded light signal to all other luminaires in the same space (optical and audible space). An example of the signals as a function of time is depicted in FIG. 5.

FIG. 6 is a timing diagram showing how a slave unit determines the distance from the master occupancy detection. A luminaire in slave mode gets triggered by a coded light and an ultrasound signal from a master luminaire. Based on the distance it will adjust its light output accordingly to the required level.

In embodiments, the coded light transmission may comprise a specific start and a specific stop code. In this case the ultrasound signal has to arrive between the start and stop codes to be considered as validly received by the receiving luminaire. Alternatively or additionally, the coded light transmission may comprise a code linked to a corresponding code in the acoustic signal. The codes may take the form of a data package or any other data signal, e.g. a data value, pattern, or signal of a particular frequency, as long as the ultrasound can be linked to the coded light (or other electromagnetic signal) in order to detect the distance towards the detected occupancy. For example the codes in the coded light and ultrasound transmissions may be linked or correspond to one another in that they have the same value, pattern or frequency, or may be linked or correspond to one another in that there is a mapping between them that will be understood by the receiving luminaire. In embodiments the code in the light may be comprised by the start and/or stop commands, i.e. the start and/or stop codes are linked to the ultrasound signal. In this case the receiving luminaire determines that ultrasound signal corresponds to the coded light signal if received between the start and stop codes of that coded light signal.

This feature may be used to avoid false detections when more masters accidentally send out occupancy detection signals. For instance, consider a large office with multiple sensors, where two or more occupancies are detected. Without the link between coded light and acoustic signal with code, the surrounding luminaires may not be able to distinguish the correct distance when there are two occupancy detections from different sensors. This message would then be considered as corrupted and resent again after a time-out. But by linking the electromagnetic and acoustic signals by a data package or other such code, which is applied by a pulse or amplitude pattern, one can determine the distance to that specific sensor. The content of such data packets could be anything as long as they are unique and linked to each other. For example the data packet may be generated by a random generator in the occupancy sensor, or a MAC address could be used for this purpose.

Hence the ultrasound signal also has a pulse pattern, which is linked to the coded light. The rising or falling edges of both demodulated signals may also be used to detect time of flight more accurately and the pattern of both signals can be used to check that both signals belonged to the same transmitter (signal from the same occupancy detector). This helps distinguish between multiple occupancy detections and data collisions. Data collision detection may already be sufficient, but this data package can make the system more reliable.

Thus in embodiments, the light (travelling with the speed of light) has two functions: triggering a distance measurement and linking the audio to its specific coded light.

To achieve the distance measurement, embodiments may be based on the following two principles. Firstly, that the speed of sound<<the speed of light. Secondly, that the time for filtering and demodulation of coded light and ultrasound must be much smaller than the time for sound to travel between the shortest distance between luminaires.

As an example, the speed of light in air=300 000 km/sec, the speed of sound in air=340 msec, and the time required for demodulation and filtering implies the minimum frequency $f_{mod}$ for the ultrasound modulation is 22 KHz. The accuracy of demodulation time $t_{demod}$ may be roughly +/−10 complete sinus cycles which will have an impact on the minimum distance measurement:

$$t\_demod = \frac{1}{fmod} \times 10$$

$$t\_demod = 900 \ \mu S$$

The minimum distance between luminaires should in this case be more than:

$$Smin = v \times t\_demod \ 0.15 \ m$$

If the ultrasound modulation frequency increases, the minimum distance between luminaires decreases. In most applications it will be pointless to have luminaires in offices closer together than 15 cm. In this case, increasing the ultrasound frequency will improve the reliability of distance sensor.

Note that these are only example calculations. Other ways of measuring distance based on an ultrasound or other acoustic signal may in themselves be understood by a person skilled in the art, and these are not excluded.

Note also that as shown in FIG. 6, in embodiments it is not essential for the ultrasound and the optical start code to be emitted from the detecting (master) luminaire at the same time—they could be emitted at different times as long as the offset is known or signaled to the other (slave) luminaire(s).

It will be appreciated that the above embodiments have been described only by way of example.

For instance, the occupancy sensor does not have to be limited to a sensor that detects occupancy in a room or other space indoor space. In embodiments, the occupancy sensor may be any presence sensor that detects presence of a being or other object, whether detecting presence in the form of proximity or existence of the being or object within a certain region or whether detecting motion of the being or object. For example the presence sensor may be based on ultrasound or infrared techniques, which in themselves will be familiar to a person skilled in the art.

Further, the applicability of the disclosure herein is not limited to any particular kind of room, and can be used in any indoor space, covered space or outdoor spaces. Example applications include offices, homes and outdoor lighting applications (e.g. parks and street lighting).

The system is not limited to being fully automated. In embodiments the system may involve an extra manual control for adjusting one or more of the luminaires, or adding an motion detection sensor.

Further, different numbers of luminaires and different arrangements than those discussed above may be used.

The determination of distance is not limited to coded light and ultrasound. In other embodiments, the distance measurement may be performed using any kind of electromagnetic signal may be used in conjunction with any acoustic signal, on the basis that the electromagnetic signal travels faster than the acoustic signal. Generally the electromagnetic signal may be any signal in the electromagnetic spectrum, e.g. an optical signal (infrared, visible spectrum or ultraviolet), radio frequency (RF) or microwave. The electromagnetic signal also does not necessarily have to be wireless as long as it is faster than sound, but could alternatively be sent over a wire in the form of a current or voltage signals. Further, the acoustic signal may be any mechanical wave travelling through a fluid.

Further, the determination of distance is not limited to being performed by comparing the timing of the electromagnetic and acoustic signals. In alternative embodiments, the receiving luminaire's controller may perform the determination by comparing the intensity of the electromagnetic and acoustic signal, on the basis that the different types of signal attenuate differently through a medium. Thus the determination as to distance between luminaires may be performed based on a ratio between the received intensity of the electromagnetic signal and the received intensity of the acoustic signal.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A first lighting device comprising: an electromagnetic sensor operable to receive an electromagnetic signal from at least one other lighting device;
   an acoustic sensor operable to receive an acoustic signal from the other lighting device; and
   a signal processing module configured to determine a distance between the first lighting device and the other lighting device based on at least one of:
   a difference in arrival time of the acoustic signal received from the other light device compared with that of the electromagnetic signal received from the other light device and
   a difference in intensity of the acoustic signal received from the other light device compared with that of the intensity of the electromagnetic signal received from the other light device,
   wherein the signal processing module is configured to perform the determination of said distance on condition of detecting a code in the acoustic signal from the other lighting device that corresponds to a code in the electromagnetic signal from the other lighting device.

2. The first lighting device of claim 1, wherein the electromagnetic signal comprises an optical signal and the electromagnetic sensor comprises an optical sensor operable to receive the optical signal, the signal processing module being configured to determine the distance by comparing the acoustic and the optical signals received from the other lighting device.

3. The first lighting device of claim 2, wherein the optical signal comprises a signal in the visible light spectrum, the signal processing module being configured to determine the distance by comparing the acoustic signal and the signal in the visible light spectrum.

4. The first lighting device of claim 3, wherein the signal in the visible light spectrum comprises a coded light signal modulated into a visible illumination output by the other lighting device.

5. The first lighting device of claim 1, wherein the acoustic signal comprises an ultrasound signal and the acoustic sensor comprises an ultrasound sensor operable to receive the ultrasound signal, the signal processing module being configured to determine the distance by comparing the ultrasound and electromagnetic signals received from the other lighting device.

6. The first lighting device of claim 1, wherein the electromagnetic and acoustic signals are indicative of occupancy being detected by the other lighting device.

7. The first lighting device of claim 6, wherein the first lighting device comprises a presence sensor, and the instances of the electromagnetic and acoustic signals from the first lighting device are transmitted in response to presence being detected by the presence sensor of the first lighting device.

8. The first lighting device of claim 1, wherein the signal processing module is configured to dim a visible illumination output of the first lighting device relative to the other lighting device based on said electromagnetic and acoustic signals and the determined distance.

9. The first lighting device of claim 8, wherein the first lighting device comprises an electromagnetic transmitter arranged to transmit an instance of the electromagnetic signal to the at least one other lighting device, and an acoustic transmitter arranged to transmit an instance of the acoustic signal to the at least one other lighting device, for determination by the other lighting device of the distance between the first lighting device and the other lighting device, and for control of a visible illumination output by the other lighting device.

10. A system of lighting devices each being configured in accordance with the first lighting device of claim 9, and each being operable to act as the other lighting device from perspective of at least one neighboring one of the lighting devices of the system;
wherein each of the lighting devices is arranged to control its respective visible illumination output without a central controller and based on no other communication with the other devices other than said electromagnetic signal and said acoustic signal received from the other device.

11. The first lighting device of claim 1, wherein the processing module is configured to determine the shortest radial distance between the first lighting device and the other lighting device.

12. A first lighting device comprising:
an electromagnetic sensor operable to receive an electromagnetic signal from at least one other lighting device;
an acoustic sensor operable to receive an acoustic signal from the other lighting device; and
a signal processing module configured to determine a distance between the first lighting device and the other lighting device based on at least one of:
a difference in arrival time of the acoustic signal received from the other light device compared with that of the electromagnetic signal received from the other light device and
a difference in intensity of the acoustic signal received from the other light device compared with that of the intensity of the electromagnetic signal received from the other light device,
wherein the electromagnetic signal from the other lighting device comprises a start code and then later a stop code, and the signal processing module is configured to use the acoustic signal from the other lighting device in the determination of said distance on condition of being received between the start and stop codes.

13. The first lighting device of claim 12, wherein the electromagnetic signal comprises an optical signal and the electromagnetic sensor comprises an optical sensor operable to receive the optical signal, the signal processing module being configured to determine the distance by comparing the acoustic and the optical signals received from the other lighting device.

14. The first lighting device of claim 13, wherein the optical signal comprises a signal in the visible light spectrum, the signal processing module being configured to determine the distance by comparing the acoustic signal and the signal in the visible light spectrum.

15. The first lighting device of claim 14, wherein the signal in the visible light spectrum comprises a coded light signal modulated into a visible illumination output by the other lighting device.

16. The first lighting device of claim 12, wherein the acoustic signal comprises an ultrasound signal and the acoustic sensor comprises an ultrasound sensor operable to receive the ultrasound signal, the signal processing module being configured to determine the distance by comparing the ultrasound and electromagnetic signals received from the other lighting device.

17. The first lighting device of claim 12, wherein the electromagnetic and acoustic signals are indicative of occupancy being detected by the other lighting device.

18. Computer program product for operating a first lighting device, comprising code embodied on a computer-readable storage medium and configured so as when executed on a processor to perform operation of:
using an electromagnetic sensor of the first lighting device to receive an electromagnetic signal from at least one other lighting device;
using an acoustic sensor of the first lighting device to receive an acoustic signal from the other lighting device; and
determining a distance between the first lighting device and the other lighting device based on at least one of:
a difference in arrival time of the acoustic signal received from the other light device compared with that of the electromagnetic signal received from the other light device and
a difference in intensity of the acoustic signal received from the other light device compared with that of the intensity of the electromagnetic signal received from the other light device,
determining said distance by detecting a code in the acoustic signal from the other lighting device that corresponds to a code in the electromagnetic signal from the other lighting device.

* * * * *